(12) United States Patent
Sagne

(10) Patent No.: US 7,046,702 B2
(45) Date of Patent: May 16, 2006

(54) RADIO RESOURCE CONTROL SIGNALING FOR PHYSICAL LAYER CONFIGURATION CHANGES

(75) Inventor: Jacques Sagne, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 945 days.

(21) Appl. No.: 10/091,595

(22) Filed: Mar. 7, 2002

(65) Prior Publication Data

US 2003/0171129 A1    Sep. 11, 2003

(51) Int. Cl.
*H04J 3/02* (2006.01)
*H04M 3/00* (2006.01)

(52) U.S. Cl. ...................... 370/538; 455/418

(58) Field of Classification Search .............. 370/329, 370/341, 431, 466–467, 524, 538; 455/403, 455/418, 432.2, 450
See application file for complete search history.

(56) References Cited

U.S. PATENT DOCUMENTS 6,501,748 B1 * 12/2002 Belaiche .................... 370/342
6,510,137 B1 *  1/2003 Belaiche .................... 370/232

FOREIGN PATENT DOCUMENTS

| GB | 2 355 890 | 5/2001 |
|----|-----------|--------|
| WO | WO 00/62465 | 10/2000 |
| WO | WO 01/17283 | 3/2001 |

OTHER PUBLICATIONS

*3GPP Technical Specification 25.331*, v.3.9.0, 3rd Generation Partnership Project; Technical Specification Group Radio Access Network; Radio Resource Control (RRC); Protocol Specification (Release 1999).
International Preliminary Examination Report.

* cited by examiner

*Primary Examiner*—Chi Pham
*Assistant Examiner*—Kerri Dyke
(74) *Attorney, Agent, or Firm*—Nixon & Vanderhye P.C.

(57) ABSTRACT

The present invention solves these problems by providing the possibility to configure or reconfigure a rate matching attribute for a given transport channel without having to perform unnecessary transport format configurations/reconfigurations. A connection with a mobile radio is established using a configuration of a radio channel that specifies a first transport format. When some aspect of the connection is to be changed, the radio channel configuration will be reconfigured, but not entirely or unnecessarily. The reconfiguration may result from a new service being added to the connection, a service for the connection being removed, or some aspect of the radio channel configuration being modified, e.g., rate change, etc. As a result of the reconfiguration, one or more rate matching parameters associated with the connection are configured without having to configure the first transport format. A rate matching algorithm is used to control an amount of data sent over the reconfigured radio channel per unit time based on one or more reconfigured rate matching parameters and one or more transport formats.

35 Claims, 4 Drawing Sheets

RADIO RESOURCE CONTROL SIGNALING FOR PHYSICAL LAYER CONFIGURATION CHANGES

FIELD OF THE INVENTION

The present invention relates to signaling in a mobile radio communications network, and more specifically, to signaling relating to physical layer configuration changes.

BACKGROUND AND SUMMARY OF THE INVENTION

Mobile radio communication systems have progressed through three generations including analog (first generation), digital (second generation), and multimedia (third generation). Third generation systems are sometimes associated with Universal Mobile Telecommunication Systems (UMTS). One example of a UMTS radio access network is the UMTS Terrestrial Radio Access Network (UTRAN) which has been specified in the Joint Standardization Projection identified as 3GPP (the Third Generation Partnership Project). In UTRAN, data generated at higher layers is carried over the radio interface with transport channels. These transport channels are mapped in the physical layer to different physical channels. The physical layer is required to support variable bit rate transport channels, to offer bandwidth-on-demand services, and to multiplex several services to one connection. In multimedia communications, other services such as e-mail, Internet access, video, and other services may be provided in addition to voice service.

When mapping transport channels to the physical channels, there are several mechanisms used to support variable bit rate transport channels and multiplexing of several services to one user connection. Each transport channel is accompanied by a Transport Format Indicator (TFI) every Transmission Time Interval (TTI) when data is expected to arrive for the specific transport channel from higher layers. The physical layer combines the TFI information from different transport channels to the transport format combination indicator (TFCI). The TFCI is transmitted in the physical control channel to inform the receiver which transport channels are active for a current frame. The TFCI is then decoded at the receiver, and the resulting TFI is given to higher layers for each of the transport channels active for the connection.

There are two types of transport channels: dedicated channels and common channels. A dedicated transport channel (e.g., DCH or DSCH) carries all of the information intended for a given user coming from layers above the physical layer including data for the actual services as well as higher layer control information. The data rate on a dedicated transport channel can change on a TTI basis. A dedicated channel is mapped onto two physical channels. The dedicated physical data channel (DPDCH) carries higher layer information including user data. The dedicated physical control channel (DPCCH) carries the necessary physical layer control information. These two dedicated physical channels are needed to support efficient variable bit rate in the physical layer. In the uplink (UL) direction, the bit rate of DPCCH is constant, whereas the bit rate of DPDCH can change from frame to frame. In the downlink (DL) direction, the DPCCH and the DPDCH are time-multiplexed on a constant rate physical layer.

Variable data rates may be implemented by a rate matching operation using rate information sent with the transport format combination indicator (TFCI) transmitted on the DPCCH for the current DPDCH frame. In other words, for every ten millisecond frame, the TFCI information decoded from the DPCCH frame is used to obtain the bit rate and channel decoding parameters for DPDCH. At the transmitter, rate matching is used to match the number of bits to be transmitted to the number available in a single frame and must take into account the number of bits coming from other transport channels that are active in a particular frame. Higher layers provide a semi-static parameter called the Rate Matching Attribute (RMA) to control rate matching between different transport channels. The rate matching attribute is used to calculate the rate matching value when multiplexing several transport channels for the same frame. By adjusting the rate matching attribute for each transport channel, it is ensured that an amount of data sent on this transport channel can efficiently be mapped on the physical layer.

Radio interface protocols are used to set up, reconfigure, and release radio bearer services provided in UTRAN. The protocol layers above the physical layer are called the data link layer (layer 2) and the network layer (layer 3). The layer 3 protocol is called Radio Resource Control (RRC) and belongs to the "control plane" (as opposed to the "user plane"). RRC messages carry the parameters required to set up, modify, and release Radio Access Bearers (RABs) and to perform channel switching. Each RAB "bears" one or more lower level, radio bearers (RBs), and each RB is mapped onto a corresponding transport channel.

The present invention is concerned with RRC signaling associated with the configuration of dedicated transport channels (e.g., DCHs). When a connection to a user equipment is initially established, and a radio access bearer is set up with one or more radio bearers, a physical radio channel configuration is set up that corresponds to the dedicated transport channels associated with each one of the one or more radio bearers. Certain parameters are specified in the radio channel configuration such as spreading factor, channel bit rate, coding, etc. The radio channel configuration also has a certain rate matching attribute established. During the lifetime of the connection, some aspect of the connection may be modified. Examples include a new service being added to the connection, an existing service being deleted from the connection, or some aspect of the channel is reconfigured, e.g., the rate of transport radio channel is modified. As a result, there is a need to reconfigure the rate matching attribute for the overall connection to accommodate the modification. However, the current 3GPP standard requires that the rate matching attribute for a transport channel in the connection can only be changed by reconfiguring the entire transport format set for this transport channel. This reconfiguration must take place even if the transport format set need not be reconfigured, i.e., nothing in the TFS changes.

Unnecessary reconfiguration is not only time consuming, it also requires unnecessary signaling which is particularly disadvantageous given scarce radio bandwidth resources. As new services are introduced, the number of transport channels defined for a particular connection will increase. This unnecessary reconfiguration of a transport format set for each transport channel leads to reduced capacity in the system as well as increased call establishment time. Redefining the transport format set unnecessarily decreases the capacity of the system by sending needless signaling over the air interface every time a new service is set up or released or some other aspect of the channel is changed, e.g., channel switching. Furthermore, procedure execution times are all increased since more transport blocks have to be transported towards the user equipment due to the increased probability of data retransmisssions. Lengthy signaling procedures could become disadvantageous for the end-user because of the increase in call establishment time and/or rate-switching execution time. Channel switching and the introduction of new transport channel rates may therefore also be adversely affected by this unnecessary signaling. In this case, the channel switching referred to is performed between two different dedicated channels (DCH-to-DCH).

The present invention solves these problems by providing the possibility to configure or reconfigure a rate matching attribute for a given transport channel without having to perform unnecessary transport format configurations/reconfigurations. A connection with a mobile radio is established using a configuration of a radio channel that specifies a first transport format. When some aspect of the connection is to be changed, the radio channel configuration will be reconfigured, but not entirely or unnecessarily. The reconfiguration may result from a new service being added to the connection, a service for the connection being removed, or some aspect of the radio channel configuration being modified, e.g., channel-rate switching, etc. As a result of the reconfiguration, one or more rate matching parameters associated with the connection are configured without having to configure the first transport format set. A rate matching algorithm is used to control an amount of data sent over the reconfigured radio channel per unit time based on one or more reconfigured rate matching parameters and one or more transport format.

Consider the following example. A first connection service for the mobile radio is established, and the radio channel is configured using a first transport format parameter and a first rate matching parameter. Thereafter, a second connection service is added that is associated with a second transport format parameter and a second rate matching parameter. The radio channel configuration is advantageously reconfigured to incorporate the second connection service with its second rate matching attribute without having to reconfigure the first transport format parameter.

As applied to a UTRAN specific example, a first setup message associated with the connection is sent to establish a first radio access bearer between the UTRAN and User Equipment (UE). The first setup message includes one or more first transport format parameters and one or more first rate parameters. A second setup message is sent to establish a second radio access bearer between the UTRAN and the UE. The second setup message includes one or more second transport format parameters, the one or more first rate parameters, and one or more second rate parameters. The first and second rate parameters are reconfigured in response to the second setup message but without having to reconfigure the first transport format parameter. Different example messaging formats are described below.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the present invention is described in an example application to UMTS/UTRAN systems, the present invention may be employed in any cellular radio system that offers multimedia services.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
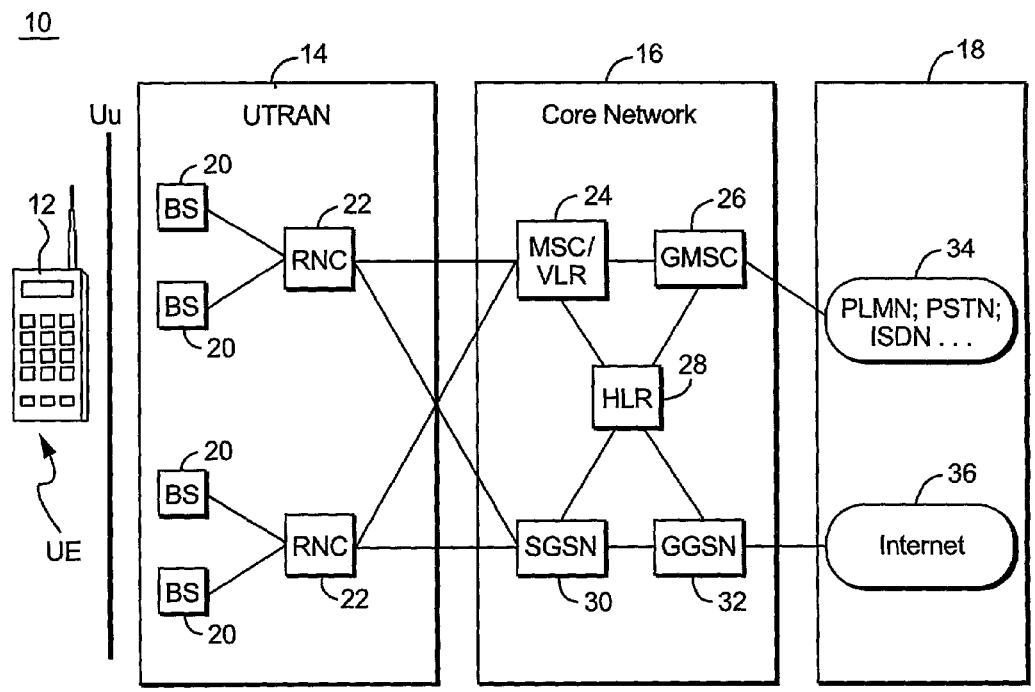
FIG. 1 is an example mobile communications system.

Although the present invention may be applied in any radio access network architecture, for purposes of illustration, it will be described in the context of a UMTS system 10 shown in FIG. 1. A User Equipment (UE) 12 communicates over a radio interface $U_u$ with a UTRAN Terrestrial Radio Access Network (UTRAN) 14. The UTRAN 14 communicates with a core network 16 coupled to an external network 18. Communication over the radio interface $U_u$ is based upon Wideband Code Division Multiple Access (WCDMA) radio technology.

The UTRAN 14 includes one or more Radio Network Controllers (RNCs) 22 which control radio resources of the radio Base Stations (BSs) 20 coupled to it. The RNC 22 is the service access point (SAP) for all services that the UTRAN provides to the core network 16, e.g., management of connections to the UE 12. The core network 16 is preferably GSM-based and includes a Home Location Register (HLR) 28, which is a database provided in the user's home system that stores the master copy of the user's service profile. For the purpose of routing incoming transactions to the UE, e.g., calls and short messages, the HLR 28 also stores the UE location on the level of the MSC/VLR 24 and/or the SGSN 30. The Mobile Services Switching Center/Visitor Location Register 24 (MSC/VLR) 24 indicates the switch (MSC) and database (VLR) that serves the UE 12 in its current location for Circuit-Switched (CS) services. The MSC switches the CS transactions, and the VLR holds a copy of the visiting user service profile, along with more precise information on the UE's location within the servicing system. The Gateway MSC (GMSC) 26 is the switch where the UMTS network connects to external circuit-switched networks such as a Public Land Mobile Network (PLMN), a Public-Switched Telephone Network (PSTN), Integrated Services Data Network (ISDN), etc. 34. The Serving GPRS (General Packet Radio Service) Support Node (SGSN) 30 functions like the MSC/VLR 24 but in the context of packet-switched (PS) services. The Gateway GPRS Support Node (GGSN) 32 functions much like the GMSC 26 but in relation to PS services coupled to an external PS network such as the Internet 36.

The present invention relates to connections between the UTRAN 14 and the UE 12 carried over a Dedicated Transport Channel (e.g., DCH), which carries all the information intended for the UE coming from layers above the physical layer including data for the actual service as well as higher layer control information. In WCDMA, variable bit rate, service multiplexing, and soft handover are employed. Each transport channel is accompanied by a transport format indicator (TFI) for each time event in which data is expected to arrive at the specific transport channel from higher layers. Transport blocks and their corresponding TFIs for each transport channel are multiplexed at the physical layer to combine the TFI information from different transport channels into the transport format combination indicator (TFCI), and transport blocks which are coded and multiplexed onto the physical data channel. The TFCI is sent over a physical control channel.

Figure 2:
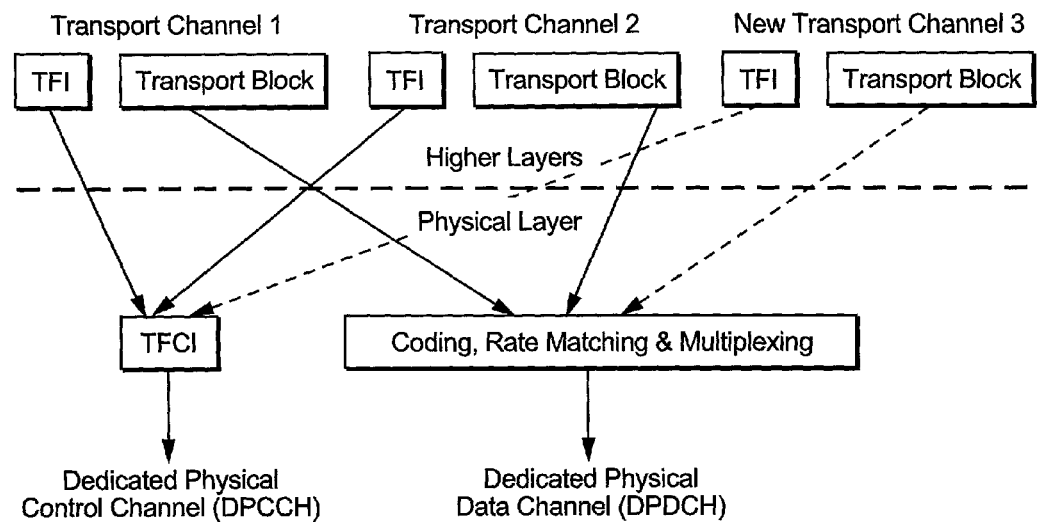
FIG. 2 is a diagram illustrating mapping different transport channels onto physical channels.

The mapping of three transport channels 1, 2, and 3 (channel 3 being a newly-added channel) is shown in FIG. 2, with the three TFIs all being combined into one TFCI and sent over the dedicated physical control channel (DPCCH). The three transport blocks are coded, rate matched, and multiplexed onto the dedicated physical data channel (DP-DCH). As described above, rate matching is used to match the number of bits to be transmitted to the number available in a single frame, e.g., a ten millisecond frame. Rate matching is achieved either by puncturing or by repetition. Because the data rates of different transport channels vary, a rate matching algorithm adjusts the rate matching parameters for each of the transport channels so that the physical channel capacity is met. Higher protocol layers provide a semi-static parameter called the rate matching attribute to control the relative rate matching between different transport channels and is used by the rate matching algorithm, along with transport formation information, to calculate a rate matching value when multiplexing several transport channels for the same frame.

As described above, the radio bandwidth resources over the radio interface $U_u$ are quite precious and need to be used judiciously. In multimedia calls where services may be added, modified, and/or deleted during the lifetime of a connection with a UE, the rate matching of the connection will have to be reconfigured to accommodate changes. This rate matching reconfiguration takes time, and signaling relating to the reconfiguration of the rate matching must be sent over the radio interface. While some reconfiguration processing and signaling is necessary, it is not necessary to reconfigure and signal already-configured information for the connection such as the transport format set associated with each transport channel already defined for the connection. The present invention avoids unnecessary reconfiguration delays and signaling over the radio interface by permitting configuration of rate matching parameters without having to reconfigure existing, already-configured transport format parameters for a connection.

Figure 3:
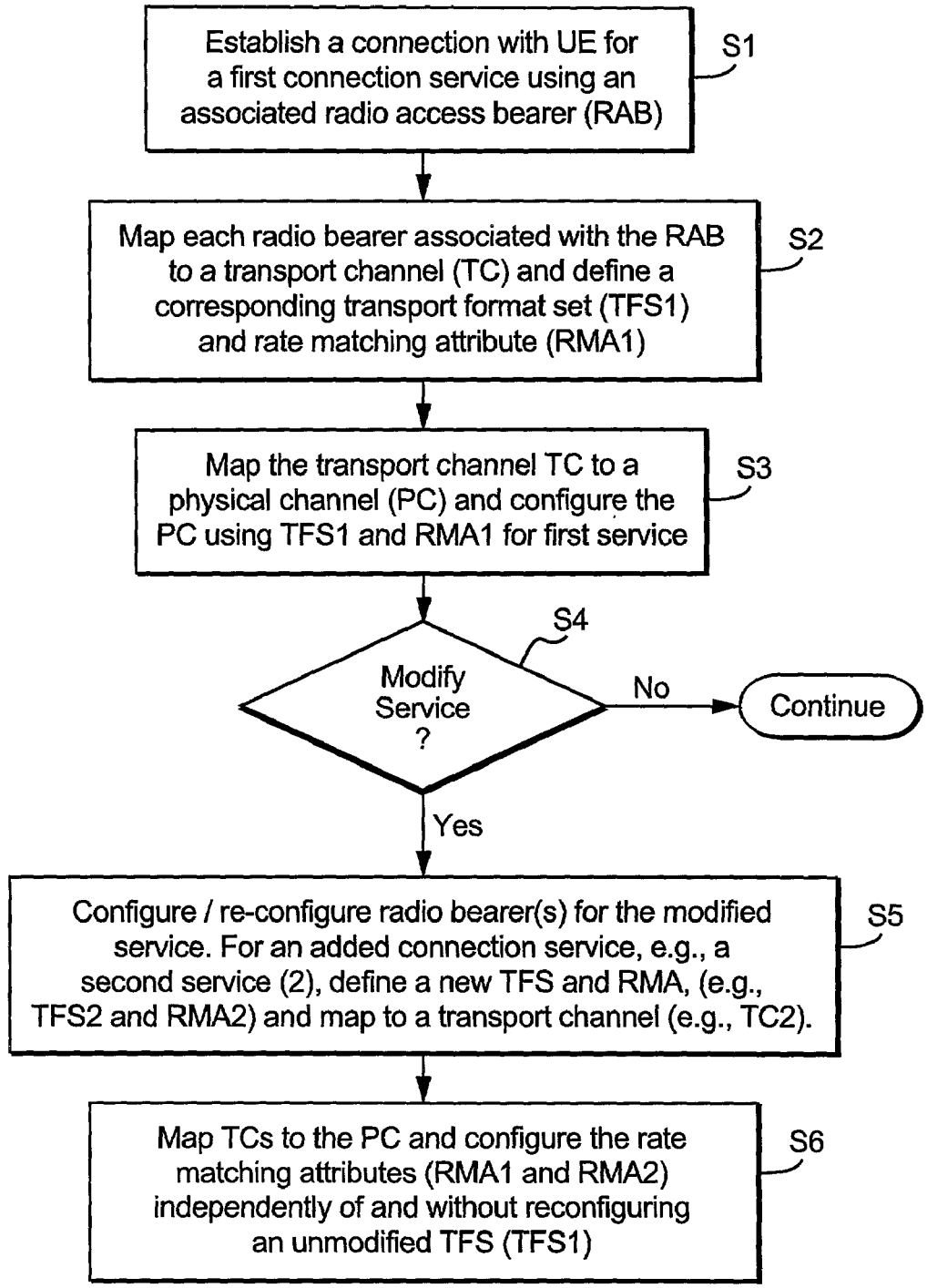
FIG. 3 is a flowchart diagram illustrating example procedures in connection with the present invention.

In this regard, reference is made to the flowchart diagram of FIG. 3 which illustrates non-limiting procedures in accordance with one example embodiment of the present invention. Initially, a connection is established with a user equipment for a first connection service which employs an associated radio access bearer (RAB) through the UTRAN to the UE (step S1). The RAB is supported by one or more radio bearers (RBs), and each radio bearer has a corresponding dedicated transport channel (e.g., DCH). For example, the first service connection might be a voice service requiring a signaling radio bearer and three speech bearers for a total of four radio bearers, and therefore, four transport channels. Each radio bearer transport channel has a corresponding transport format set (TFS) and rate matching attribute (RMA) (step S2). Each transport channel associated with the first service connection is mapped to a physical channel, and the physical channel is configured using the transport format set and rate matching attribute information associated with the first connection service (step S3).

A decision is made (step S4) whether the connection service to the UE is to be modified in any way, where modification includes, for example, adding a service, deleting a service, or reconfiguring a service. If so, one or more radio bearers are configured (for an added radio bearer) or reconfigured for a modified or deleted existing service (step S5). For the example of an added connection service, e.g., a second service (2), a new transport format set and a new rate matching attribute, (i.e., TFS2 and RMA2), are associated with one or more corresponding transport channels, (e.g., TC2). The transport channels remaining after the modification of service are mapped to the physical channel. The rate matching attributes are configured independently of and without having to reconfigure a transport format set for a transport channel that has not been affected by the service modification (step S6). For example, if the first connection service has a transport format set TFS1 and rate matching attribute RMA1 for a corresponding transport channel, and the TFS1 is not affected by a service modification which adds a new transport channel with TFS2 and RMA2. The rate matching attributes RMA1 and RMA2 are configured without having to reconfigure TFS1. TFS2 is configured along with the RMA1 and RMA2.

As explained in the background, the current 3GPP specification does not allow for this kind of efficient configuration/reconfiguration when a service is modified for an existing connection with a UE. Indeed, because the rate matching attribute for a transport channel is part of the transport format set for the transport channel, the entire transport format set for each transport channel existing at the time of the connection modification must be redefined even though the only part of the transport format set of the existing transport channels that needs to be redefined is the rate matching attribute. By avoiding this unnecessary reconfiguration of the entire transport format set for all existing transport channels in an existing service connection with a UE, the present invention increases the capacity of the system by eliminating needless signaling over the radio interface each time a new service is set up, modified, or released, or when some modification is performed to the physical channel such as a channel-rate switching. Moreover, the present invention reduces call establishment time because less reconfiguration, processing, and signaling is performed. The advantages of the present invention are particularly evident as more and more connection services are added and deleted and channel configuration optimization is employed (e.g., channel-rate switching).

Figure 4:
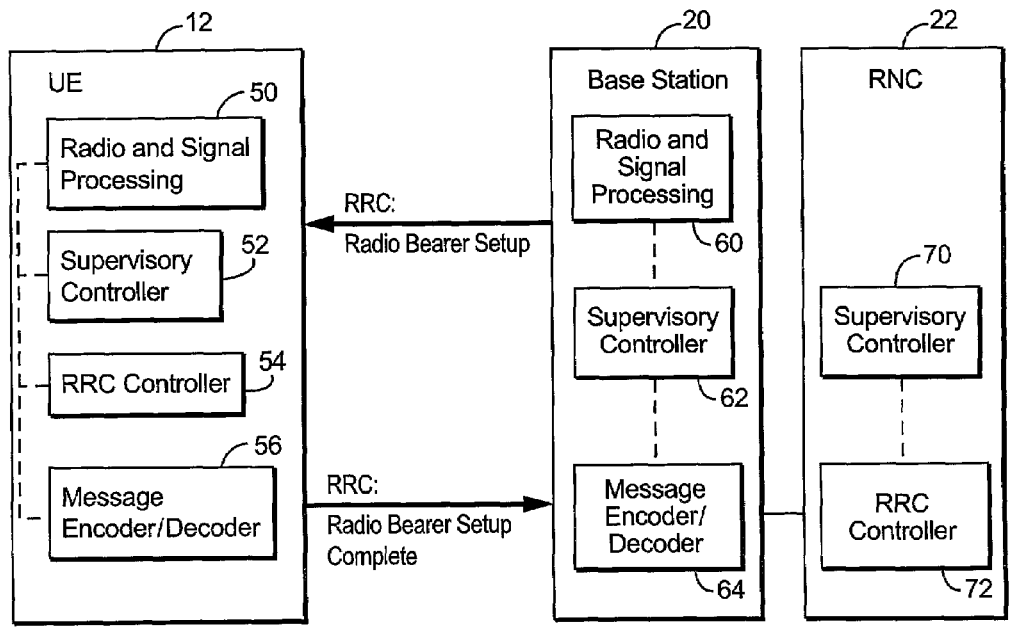
FIG. 4 illustrates in function block format radio bearer setup signaling between the UE and the UTRAN.

A non-limiting example implementation will now be described using signals and formats from the 3GPP Technical Specification 25.331 (Release 1999). Adding, deleting, or modifying a service is accomplished using the Radio Resource Control (RRC) protocol which defines control signaling between the UE and the UTRAN. Specifically, RRC messages carry all parameters required to set up, modify, and release layer 3, 2 and 1 protocol entities. FIG. 4 illustrates an RRC Radio Bearer Setup message being sent from the UTRAN (represented in FIG. 4 as a base station 20 coupled to an RNC 22). After processing, the UE 12 responds with a Bearer Radio Setup Complete (RRC) message. The UE 12 includes various processing entities including a radio and signaling processing entity 50, a supervisory controller 52, an RRC controller 54, and a message encoder/decoder 56. Base station 20 includes radio and signaling processing entity 60, a supervisory controller 62, and a message encoder/decoder 64. The RNC 22 includes a supervisory controller 70 coupled to an RRC controller 72. The radio and signaling processing entities 50 and 60 take care of the physical layer communication functions. The RRC controllers 54 and 72 carry out the radio resource control protocol message signaling and the message encoder/decoder entities 56 and 64 perform message encoding and decoding operations. The supervisory controllers 52, 62, and 70 supervise the overall operations of their respective nodes. Of course, it is understood that there are other software/hardware entities in these various nodes which are not necessary for an understanding of the present invention.

The current 3GPP Technical Specification 25.331 requires that the following information be configured each time that a connection service is added, deleted, or modified for uplink and downlink transport channels. The acronym UL corresponds to uplink, TrCH corresponds to transport channel, MP corresponds to mandatory parameter, DL corresponds to downlink.

```
Added or Reconfigured UL TrCH information
    >Uplink transport channel type (MP)
    >UL Transport channel identity (MP)
    >TFS (MP)
        >>CHOICE Transport channel type: Dedicated transport
        channels (MP)
            >>Dynamic Transport Format Information (MP)
                >>>>RLC Size (MP)
                >>>>Number of TBs and TTI List (MP)
                    >>>>>Number of Transport blocks
                >>>>CHOICE Logical Channel List (MP)
            >>>Semi-static transport Format Indication (MP)
                >>>>Transmission time interval (MP)
                >>>>Type of channel coding (MP)
                >>>>Rate matching attribute (MP)
                >>>>CRC size (MP)
Added or Reconfiguration DL TrCH Information
    >Downlink transport channel type (MP)
    >DL Transport channel identity (MP)
    >CHOICE DL parameters (MP)
        >>Explicit
            >>>TFS (MP)
        >>SameAsUL
            >>>UL transport channel type (MP)
            >>>UL TrCH identity (MP)
```

As can be seen, if a rate matching attribute of an existing transport channel must be modified, the entire transport format set (TFS) has to be redefined even though the transport format set remains unchanged in order to get access to the rate matching attribute information element (IE). Specifically, the only reconfiguration "choice" includes choosing both the TFS and rate matching attribute.

In one example to implement the present invention, this Radio Bearer Setup message for adding a new service to an existing user connection may be reformatted in accordance with the following:

```
Added or Reconfigured UL TrCH information
    >Uplink transport channel type (MP)
    >UL Transport channel identity (MP)
    >CHOICE Reconfiguration
        >>TFS
            >>>CHOICE Transport channel type: Dedicated transport
            channels (MP)
                >>>>Dynamic Transport Format Information (MP)
                    >>>>>RLC Size (MP)
                    >>>>>Number of TBs and TTI List (MP)
                        >>>>>Number of Transport blocks (MP)
                    >>>>>CHOICE Logical Channel List (MP)
                >>>>Semi-static transport Format Indication (MP)
                    >>>>>Transmission time interval (MP)
                    >>>>>Type of channel coding (MP)
                    >>>>>Rate matching attribute (MP)
                    >>>>>CRC size (MP)
        >>Rate matching attribute (MP)
Added or Reconfigured DL TrCH information
    >Downlink transport channel type (MP)
    >DL Transport channel identity (MP)
    >CHOICE DL parameters (PM)
        >>Explicit
            >>>CHOICE Reconfiguration
                >>>>TFS
                >>>>Rate Matching attribute
        >>SameAsUL
            >>>UL transport channel type (MP)
            >>>UL TrCH identity (MP)
```

Here, the RRC message Added or Reconfigured UL/DL TrCH information is reformatted so that the transport format set is one option for possible reconfiguration. Another option is the rate matching attribute. The CHOICE field permits access to the rate matching attribute without it requiring configuration/reconfiguration of the transport format set.

Another example implementation to permit this access to the rate matching attribute for a transport channel independent of an associated transport format set provides an information element, named here for purposes of illustration as Reconfigured Uplink/Downlink TrCH Rate Matching Attribute, and adds it to the RRC Radio Bearer Setup message. In this way, the existing Added or Reconfigured UL/DL TrCH information element is not modified:

Reconfigured UL TrCH rate matching attribute
   >Uplink transport channel type (MP)
   >UL Transport channel identity (MP)
   >Rate matching attribute (MP)
Reconfigured DL TrCH rate matching attribute
   >Downlink transport channel type (MP)
   >DL Transport channel identity (MP)
   >Rate matching attribute (MP)

Both of these example implementations allow reconfiguration of the rate matching attribute for a particular transport channel without having to needlessly redefine the transport format set for that transport channel.

Figure 5A:
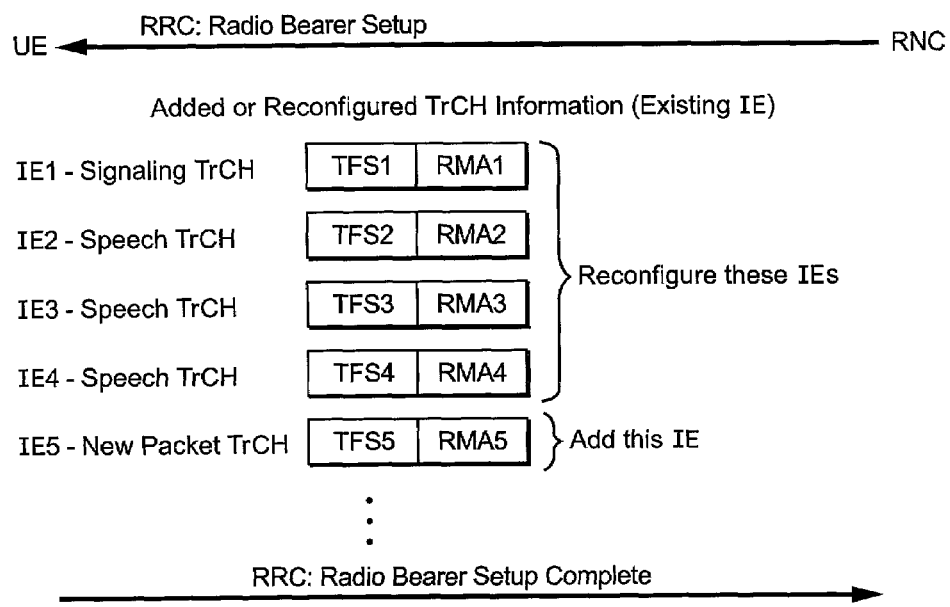
FIGS. 5A–5C are signaling diagrams useful in explaining certain features of the present invention.
Figure 5B:
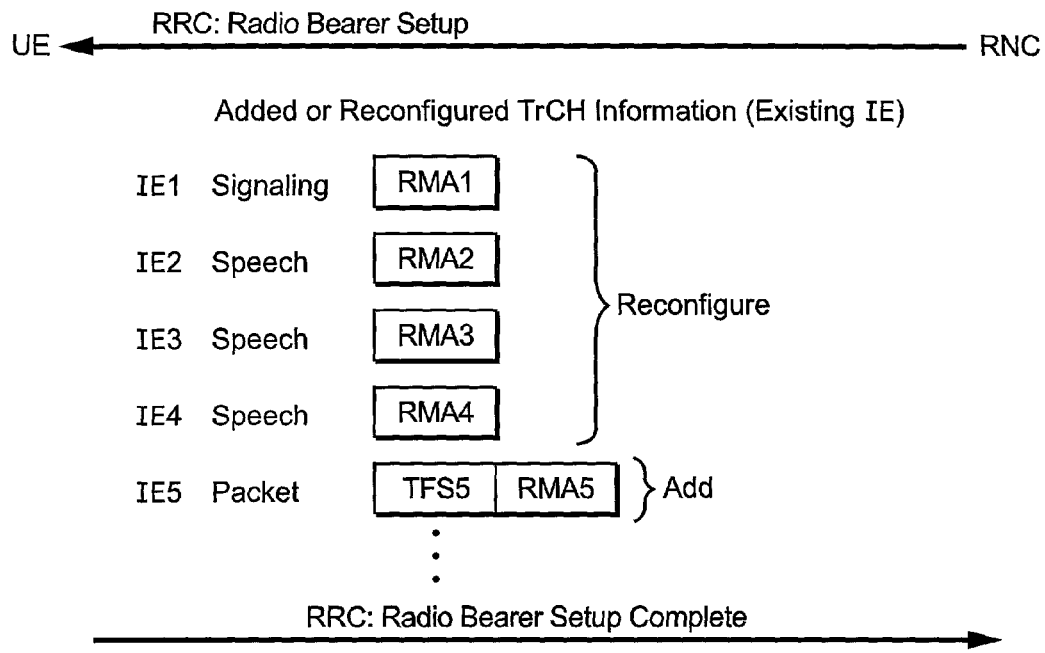
Figure 5C:
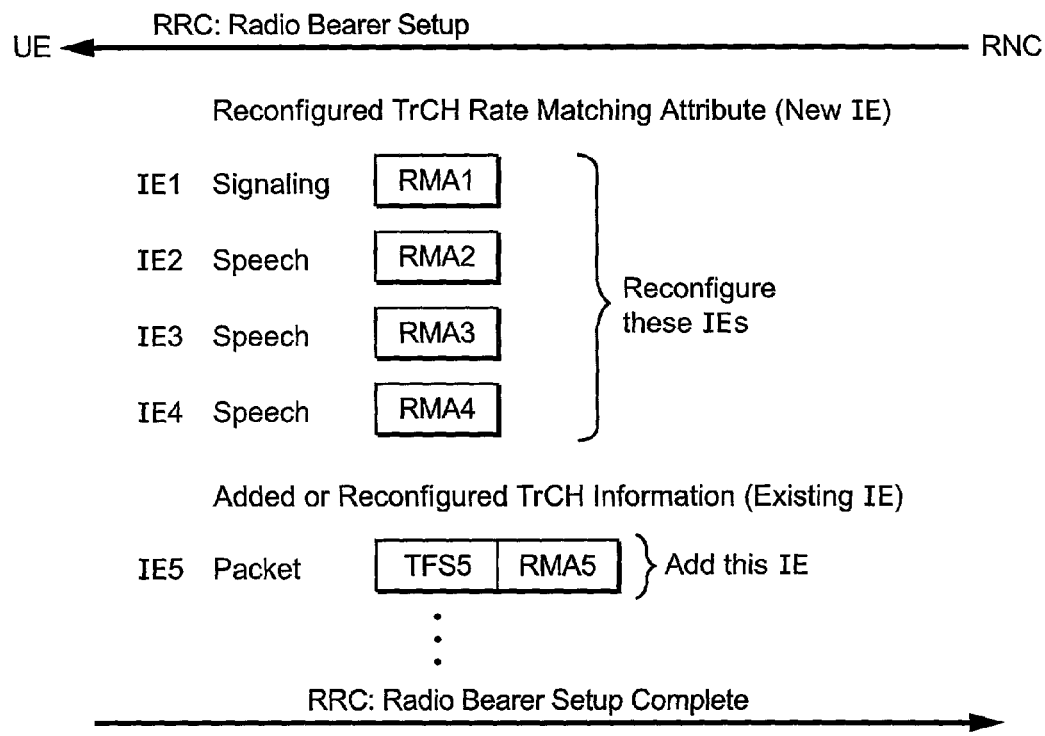

Reference is now made to FIGS. 5A–5C. FIG. 5A shows a Radio Bearer Setup RRC message sent from the RNC to the UE with Added or Reconfigured TrCH information (an existing information element in the Radio Bearer Setup message). The first information element IE1 corresponds to a signaling transport channel (TrCH), the second IE to a speech transport channel, the third IE to a speech transport channel, and the fourth IE to a speech transport channel. Each of these information elements relates to already-existing transport channels. The fifth information element IE5 relates to a new packet service transport channel to be added to the user connection. In the current 3GPP specification, both the transport format set and the rate matching attribute for an existing transport channel must be reconfigured in order to add the new packet service. While the new packet transport format set TFS5 and rate matching attribute RMA5 must be configured along with the existing rate matching attributes RMA1, RMA2, RMA3, and RMA4 for the connection, the unaffected, existing transport format sets TFS1, TFS2, TFS3, and TFS4 do not need to be reconfigured. Nevertheless, the existing 3GPP approach requires reconfiguration of these existing transport format sets TFS1, TFS2, TFS3, and TFS4 in order to perform rate matching with RMA1–RMA5. This is illustrated as the TFS and RMA being shown as one information element.

FIG. 5B shows how the Added or Reconfigured TrCH information element can be changed so that the four rate matching attributes RMA1–RMA4 corresponding to the four existing transport channels are reconfigured along with the transport format set and rate matching attribute for the newly-added packet service, i.e., TFS5 and RMA5. TFS1–TFS4 are not reconfigured.

FIG. 5C shows the example alternative in which the Added or Reconfigured TrCH information element is not changed, and instead, the RRC radio bearer setup message includes a new information element illustratively called Reconfigured TrCH Rate Matching Attribute. The information elements IE1–IE4 for this new message for the existing signaling and speech services include only their corresponding rate matching attributes RMA1–RMA4. These four rate matching information elements from the existing transport channels are accessed and then configured with the rate matching attribute RMA5 for the newly-added packet service. In both the examples of FIGS. 5B–5C, a rate matching algorithm utilizes the configured rate matching attributes RMA1–RMA5 plus the existing transport format sets TFS1–4 and the newly-configured TFS5 to perform the rate matching function for this UE connection.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method for reconfiguring a radio channel configuration associated with a mobile radio, comprising:
    establishing a first connection service for the mobile radio associated with a first transport format parameter;
    configuring the radio channel configuration for the first connection service using the first transport format parameter and a rate matching parameter;
    thereafter, adding a second connection service for the mobile radio associated with a second transport format parameter; and
    reconfiguring the radio channel configuration to include the second connection service without reconfiguring the first transport format parameter.

2. The method in claim 1, wherein the reconfiguring uses one or more rate matching parameters and includes configuring the second transport format parameter.

3. The method in claim 1, wherein the first and second transport format parameters correspond to first and second transport format sets that specify plural available transport formats for transporting data over the radio channel.

4. The method in claim 1, further comprising:
    mapping the first connection service to one or more first transport channels;
    mapping the second connection service to one or more second transport channels; and
    multiplexing the first and second transport channels onto the physical radio channel.

5. The method in claim 4, wherein each transport channel includes a transport format parameter and a rate matching attribute, the method further comprising:
    using a rate matching algorithm to control an amount of data sent over the radio channel per unit time from each transport channel based on the rate matching attribute and the transport format parameter associated with each transport channel.

6. The method in claim 1, further comprising:
    using a rate matching algorithm to control an amount of data sent over the radio channel per unit time for each of the first and second connection services based on rate matching attributes and transport format parameters associated with the first and second connection services.

7. The method in claim 1, further comprising:
    modifying one of the first and second connection services, and
    configuring one or more rate matching parameters for the radio channel configuration independently of one of the first and second transport format parameters corresponding to the other of the first and second connection services.

8. The method in claim 7, wherein the modifying includes releasing the one connection service.

9. The method in claim 7, wherein the radio channel is a first type of radio channel, and the modifying includes changing the radio channel to a second type of radio channel.

10. The method in claim 1, wherein the first connection service is one of a voice service and a packet data service, and the second connection service is the other.

11. A method for use in a UMTS communications system including a radio access network (RAN) for supporting a connection with a user equipment (UE) over a radio interface, comprising:
    sending a first setup message associated with the connection to establish a first radio access bearer between the RAN and the UE, the first setup message including one or more first transport format parameters and one or more first rate parameters, and
    sending a second setup message associated with the connection to establish a second radio access bearer between the RAN and the UE, the second setup message including one or more second transport format parameters, the one or more first rate parameters, and one or more second rate parameters,
    wherein the first and second rate parameters are reconfigured in response to the second setup message without having to reconfigure the first transport format parameter.

12. The method in claim 11, wherein the first and second transport format parameters and the first and second rate parameters are part of an Added or Reconfigured Transport Channel information element included in the second setup message, and
    wherein the first and second rate parameters may be reconfigured independently from the first and second transport format parameters, respectively.

13. The method in claim 11, wherein the first rate matching parameter is part of a Reconfigured Transport Channel Rate Matching Attribute information element included in the second setup message, and wherein the second transport format parameter and the second rate parameter are part of an Added or Reconfigured Transport Channel information element included in the second setup message.

14. The method in claim 11, wherein the first and second transport format parameters correspond to first and second transport format sets that specify plural available transport formats for transporting data over a radio channel.

15. The method in claim 11, further comprising:
mapping the first radio access bearer to one or more first transport channels;
mapping the second radio access bearer to one or more second transport channels; and
multiplexing the first and second transport channels onto the physical radio channel.

16. A method for use in configuring a connection with a mobile radio over a radio channel, comprising:
establishing the connection with the mobile radio using a configuration of the radio channel which specifies a first transport format;
sending a message that will involve reconfiguring the radio channel configuration;
determining that one or more rate matching parameters must be configured as a result of the reconfiguration; and
configuring the one or more rate matching parameters without having to configure the first transport format.

17. The method in claim 16, wherein the reconfiguration results from a new service for the connection that includes a second transport format.

18. The method in clam 16, wherein the reconfiguration results from one of plural services for the connection being removed.

19. The method in clam 16, wherein the reconfiguration results from some aspect of the radio channel configuration being modified.

20. The method in claim 19, wherein the modified aspect is a rate of the radio channel being changed.

21. The method in claim 16, further comprising:
using a rate matching algorithm to control an amount of data sent over the reconfigured radio channel per unit time based on one or more reconfigured rate matching parameters and one or more transport formats.

22. A mobile user equipment terminal for use in a mobile radio communications system, comprising:
radio processing circuitry for sending and receiving signals over a radio interface, and
control circuitry, coupled to the radio processing circuitry, configured to:
establish a connection over a radio channel using the radio processing circuitry, where the radio channel has a first configuration which specifies a first transport format;
detect a need for a reconfiguration of the radio channel configuration;
determine that one or more rate matching parameters must be configured as a result of the reconfiguration; and
configure the one or more rate matching parameters without having to configure the first transport format.

23. The mobile user equipment terminal in claim 22, wherein the reconfiguration results from a new service for the connection that includes a second transport format.

24. The mobile user equipment terminal in clam 22, wherein the reconfiguration results from one of plural services for the connection being removed.

25. The mobile user equipment terminal in clam 22, wherein the reconfiguration results from some aspect of the radio channel configuration being modified.

26. The mobile user equipment terminal in claim 25, wherein the modified aspect is a rate of the radio channel being changed.

27. The mobile user equipment terminal in claim 22, the control circuitry being further configured to use a rate matching algorithm to control an amount of data sent over the reconfigured radio channel per unit time based on the configured rate matching parameters and the first transport format.

28. The mobile user equipment in claim 22, wherein the one or more rate matching parameters correspond to one or more rate matching attributes, and the first transport format includes a first transport format set that specifies plural available transport formats for transporting data over the radio channel.

29. A radio network for use in a mobile radio communications system, comprising:
radio processing circuitry for sending and receiving signals over a radio interface, and
control circuitry configured to:
establish a connection over a radio channel using the radio processing circuitry, where the radio channel has a first configuration which specifies a first transport format;
detect a need for a reconfiguration of the radio channel configuration;
determine that one or more rate matching parameters must be configured as a result of the reconfiguration; and
configure the one or more rate matching parameters without having to configure the first transport format.

30. The radio network in claim 29, wherein the reconfiguration results from a new service for the connection that includes a second transport format.

31. The radio network in claim 29, wherein the reconfiguration results from one of plural services for the connection being removed.

32. The radio network in claim 29, wherein the reconfiguration results from some aspect of the radio channel configuration being modified.

33. The radio network in claim 32, wherein the modified aspect is a rate of the radio channel being changed.

34. The radio network in claim 29, the control circuitry being further configured to use a rate matching algorithm to control an amount of data sent over the reconfigured radio channel per unit time based on the configured rate matching parameters and the first transport format.

35. The radio network in claim 29, wherein the one or more rate matching parameters correspond to one or more rate matching attributes, and the first transport format includes a first transport format set that specifies plural available transport formats for transporting data over the radio channel.

* * * * *